United States Patent [19]

Mabuchi et al.

[11] 3,959,706

[45] May 25, 1976

[54] CHARGER

[75] Inventors: Kenichi Mabuchi, Tokyo; Yoshihisa Tsuchimochi, Ichikawa, both of Japan

[73] Assignee: Mabuchi Motor Co. Ltd., Tokyo, Japan

[22] Filed: Aug. 20, 1974

[21] Appl. No.: 498,985

[30] Foreign Application Priority Data

Aug. 25, 1973 Japan.......................... 48-99803[U]
Aug. 25, 1973 Japan.......................... 48-9980[U]
Aug. 27, 1973 Japan.......................... 48-100449[U]
Mar. 4, 1974 Japan.......................... 49-25767[U]

[52] U.S. Cl.................................. 320/2; 320/3; 320/5; 320/35
[51] Int. Cl.² ..................... H02J 7/00; H01M 45/04
[58] Field of Search ................................ 320/2–7, 320/15–19, 35, 36, 25; 136/181

[56] References Cited

UNITED STATES PATENTS

| | | | |
|---|---|---|---|
| 2,556,506 | 6/1951 | Roberts | 320/25 X |
| 3,414,793 | 12/1968 | Jasperson | 320/2 UX |
| 3,579,075 | 5/1971 | Floyd | 320/48 X |
| 3,629,680 | 12/1971 | Baynes et al. | 320/2 |
| 3,665,285 | 5/1972 | Mullersman et al. | 320/2 |
| 3,681,673 | 8/1972 | Weinstock | 320/36 X |
| 3,735,232 | 5/1973 | Fister | 320/2 |

Primary Examiner—Mark O. Budd
Assistant Examiner—Robert J. Hickey

[57] ABSTRACT

A portable charger, together with its accessory devices, is disclosed which has incorporated a circuit such that when the cell to be charged is mounted thereon, a discharge circuit will be closed to clear the residual charge in the cell to be charged and then, by pressing a push button manually, the cell will be charged.

30 Claims, 24 Drawing Figures

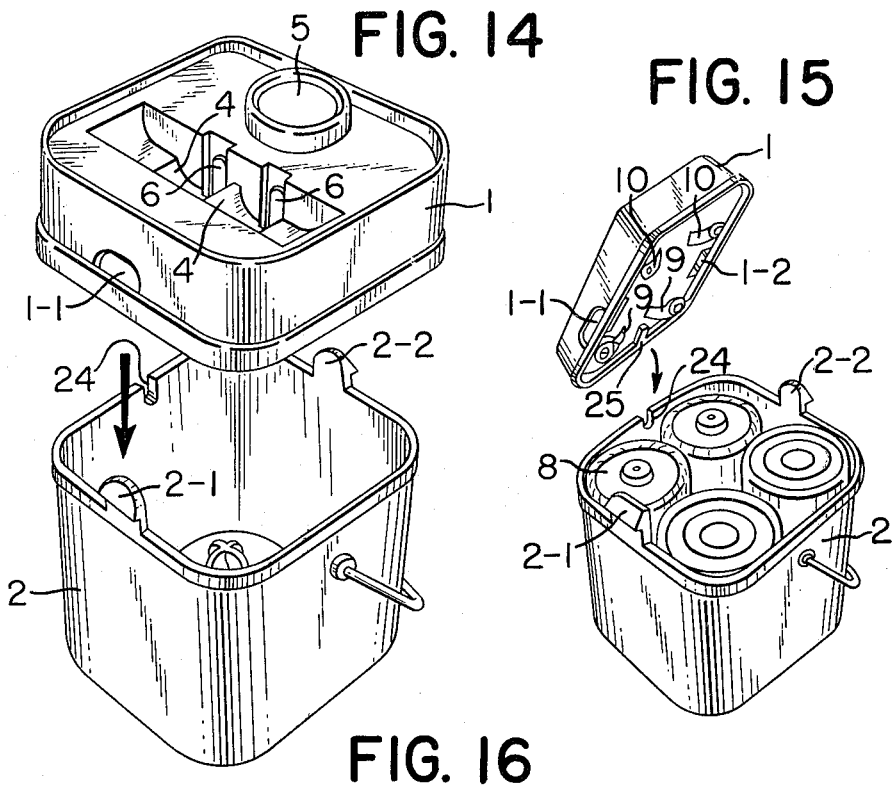
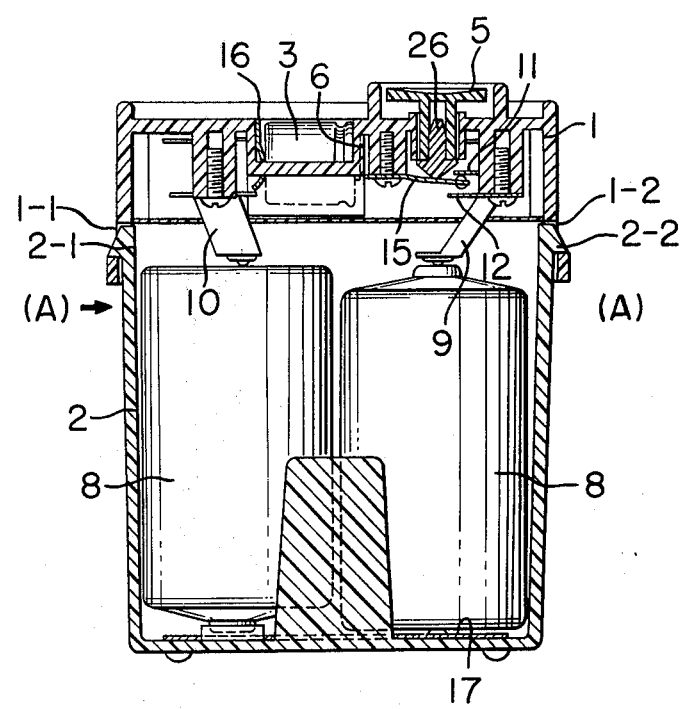

FIG. 17A
FIG. 17C
FIG. 17B
FIG. 18
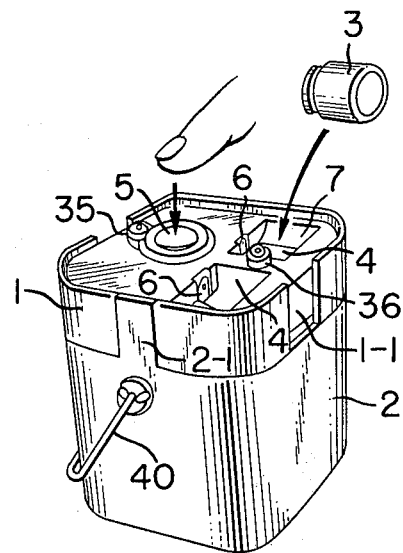
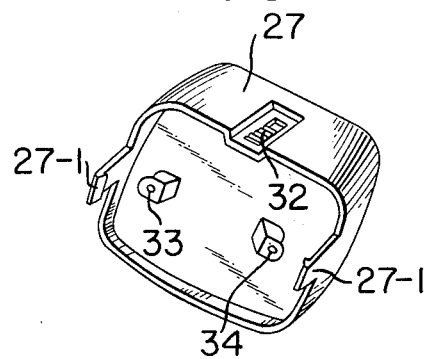
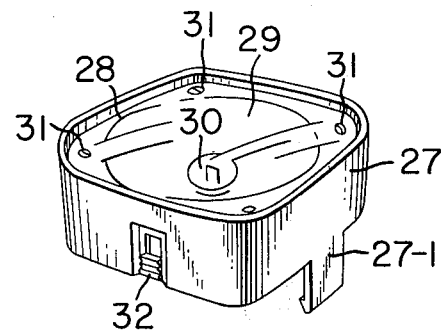
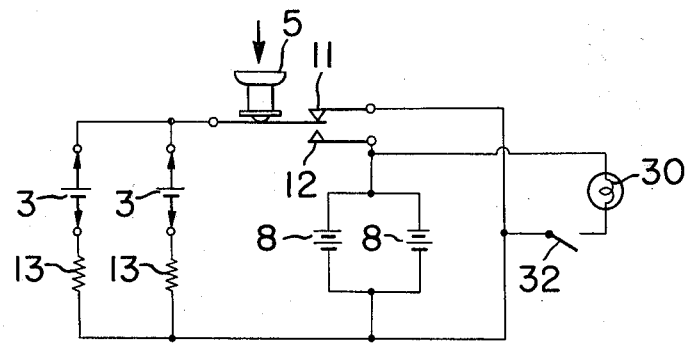

CHARGER

BACKGROUND OF THE INVENTION

1. Field of the Invention

This invention relates to a charger and, more particularly, to a portable charger in which a discharge circuit for the cell to be charged is closed when the cell is in its mounted position, and in which the charging circuit for the cell to be charged will be closed only while a change-over switch is being manually operated, whereby to prevent overcharging of the cell and to prevent occurrence of the inverse charging phenomenon encountered when the cells are used in a series connection.

DESCRIPTION OF THE PRIOR ART

There have recently been developed nickel-cadmium type cells and among them is the nickel-cadmium type cell which has a relief valve for releasing gas in the event of overcharging. This cell has attracted much attention due to the fact that its internal resistance is so low that, even though its capacity may be small, the cell can afford a discharge current of as much as several amperes or more, that it may be charged even after it has discharged until its terminal voltage becomes zero, and that it may be quickly recharged in a few minutes.

This type of quickly chargeable nickel-cadmium cell may be used as the source of power for the propulsion of a model airplane, for instance.

A portable charger for such nickel-cadmium type cells has been contemplated which uses as source of electric energy four UM1 dry cells, for example. In such a case, besides any mishandling of the charger, it is desirable to prevent the occurrence of overcharging, which is the biggest cause for the deterioration of the cell, while on the other hand, it is also desirable to provide an inexpensive charger which eliminates such expensive components as timer circuits, charging completion detecting circuits, etc.

SUMMARY OF THE INVENTION

It is an object of the invention to provide an inexpensive portable charger which does not use such expensive means as timer circuit, charging completion detecting circuit, etc.

It is another object of the invention to provide a charger as mentioned above, equipped with an indicator means to indicate either or both of charged and discharged conditions.

It is another object of the invention to provide a charger having a pocket or compartment for storing the cell to be charged within the body of the charger.

It is another object of the invention to provide a charger of the type mentioned designed to avoid error in the polarity of the charger.

It is still another object of the invention to provide a charger of the type mentioned having a body and a lid therefor which are easily separable from each other by means of a spring action.

It is a further object of the invention to provide a charger of the type mentioned in which a light housing equipped with an illuminating lamp is added to the body of the charger.

It is still a further object of the invention to provide a charger of the type mentioned having a push-button suitable for large current at low voltages.

BRIEF DESCRIPTION OF THE INVENTION

Figure 1:
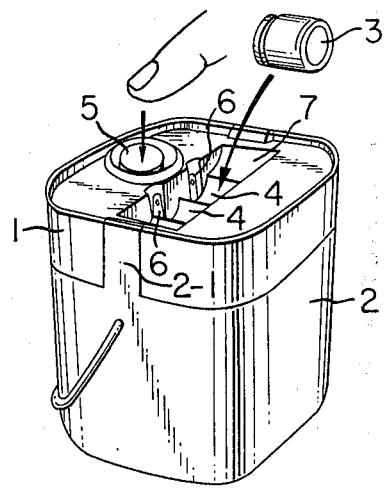
FIG. 1 is a general perspective view of a charger embodying the invention.
Figure 3:
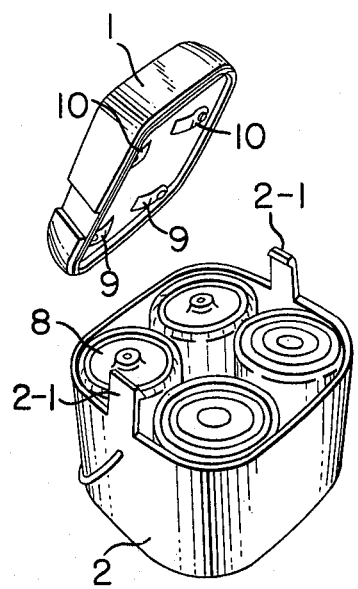
Figure 4:
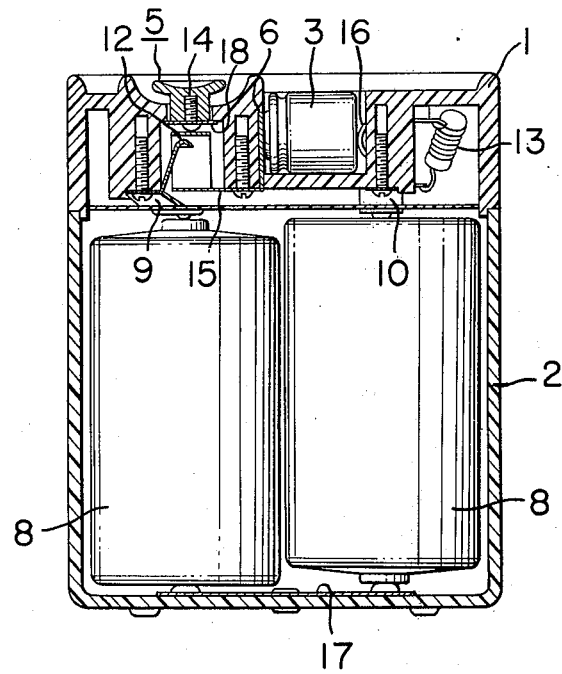
Figure 5:
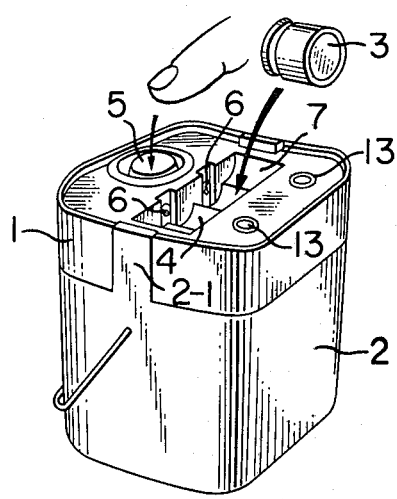
Figure 6:
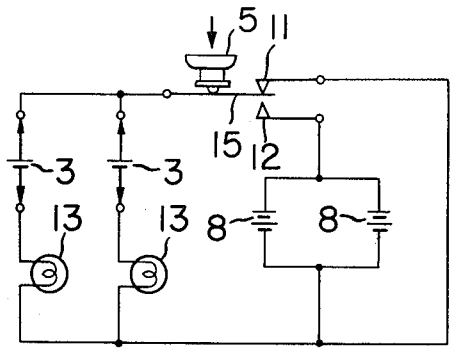
Figure 7:
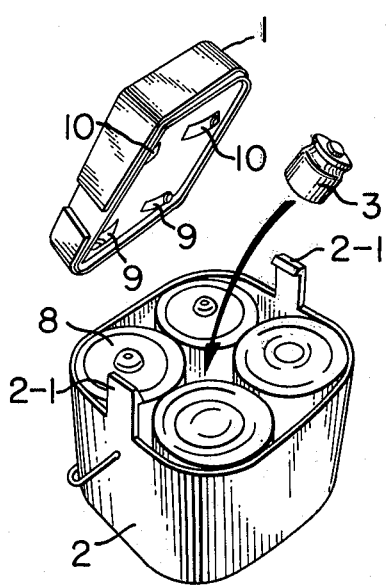
Figure 8:
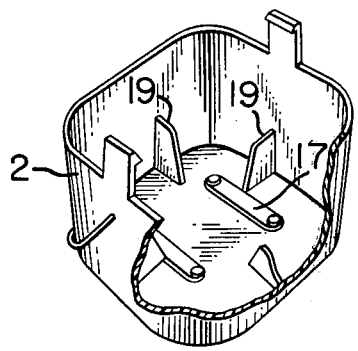
Figure 10:
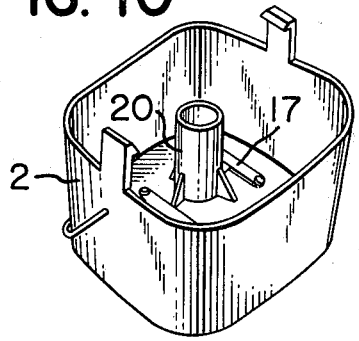
Figure 9:
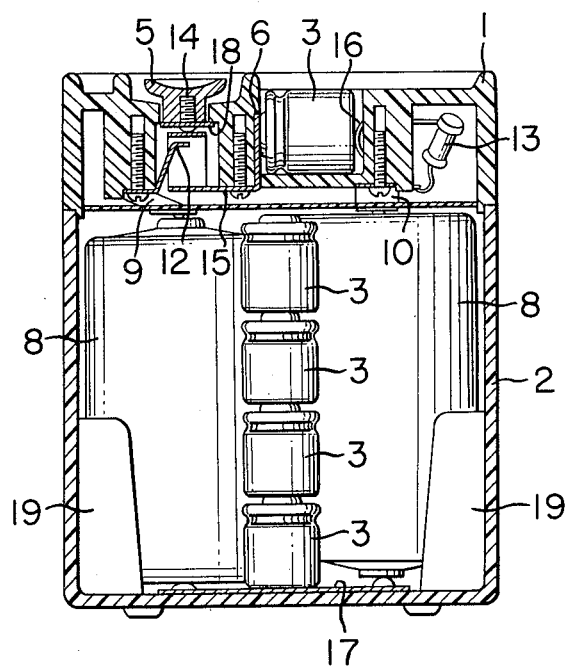
Figure 11:
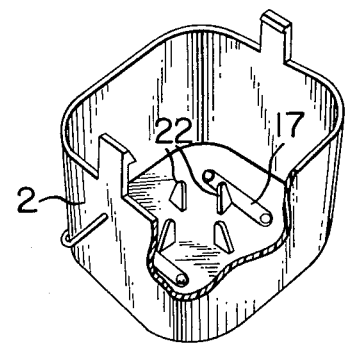
Figure 12:
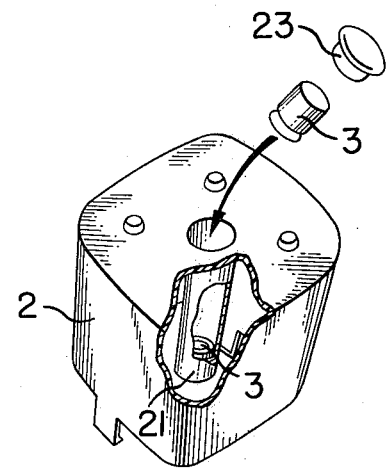
Figure 13:
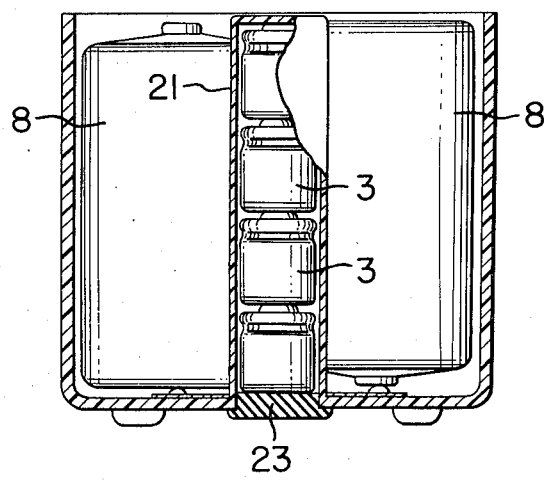
Figure 19:
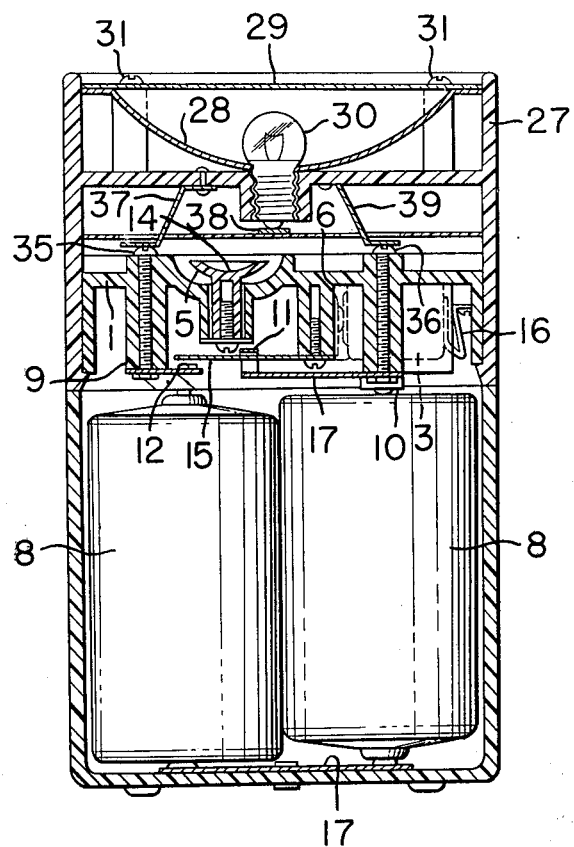
Figure 20:
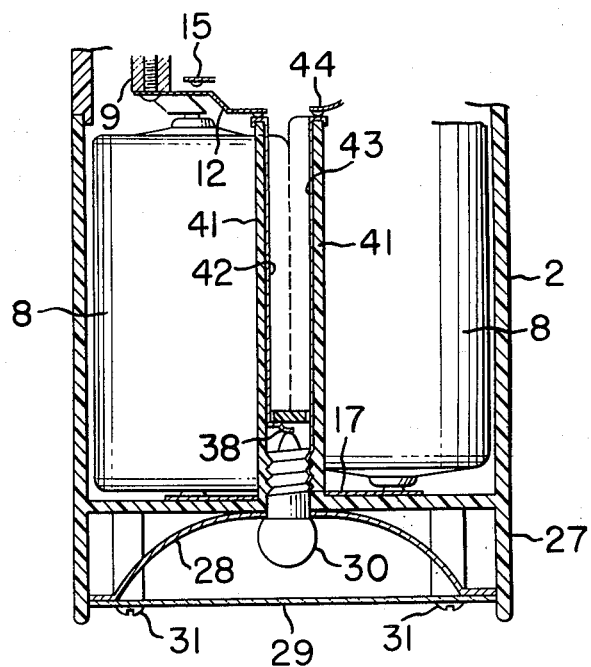
Figure 21:
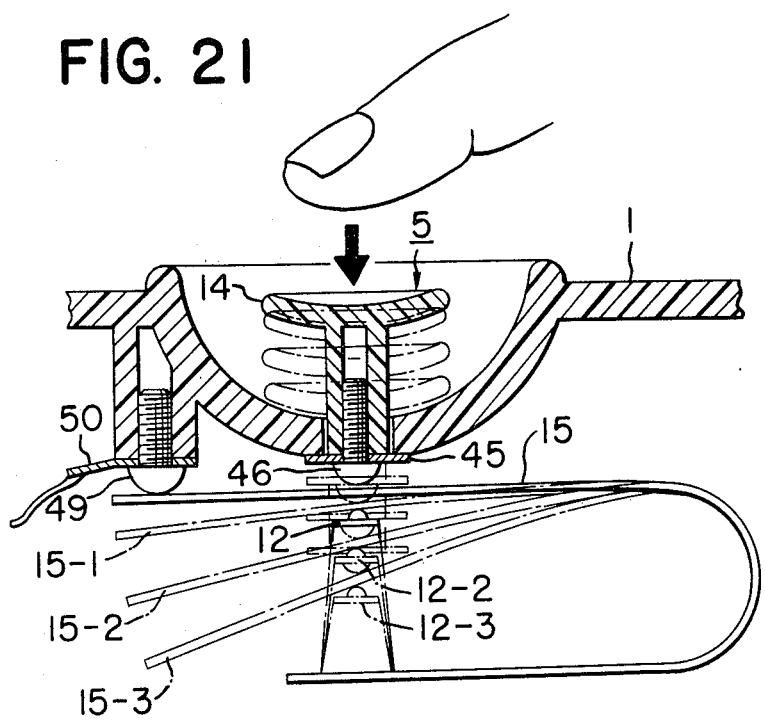
Figure 22:
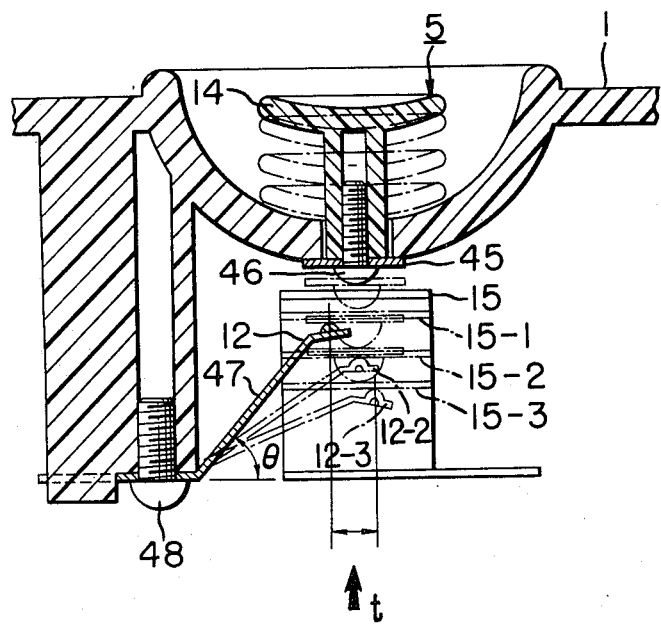

FIG. 3 is a perspective view of the embodiment showing cells as the electric source contained therein, FIG. 4 is a vertical cross-section of the charger shown in FIG. 1 showing the interior construction, FIG. 5 is a general perspective view of a charger equipped with indicator means, FIG. 6 is a circuit diagram for the charger shown in FIG. 5, FIG. 7 is a perspective view of an embodiment showing how the cell to be charged may be put into a pocket therefor, FIGS. 8, 10, 11 and 12 are perspective views of embodiments showing different forms of the pocket for receiving the cell to be charged, FIGS. 9 and 13 are vertical cross-sectional views showing the internal construction of the embodiments shown in FIGS. 8 and 12, respectively, FIG. 14 is a perspective view of a charger embodying the invention designed to avoid error in polarity, FIG. 15 is a knocked down perspective view of the same, FIG. 16 is a vertical cross-section of a charger embodying the invention, with a lid readily removable away from the case body, FIGS. 17 A,B,C are knocked down perspective views of a charger embodying the invention equipped with an illuminating lamp, FIG. 17A showing the charger proper, FIG. 17B showing a perspective view of the light housing part as seen obliquely from above, and FIG. 17C showing a perspective view of the light housing part as seen obliquely from below, FIG. 18 is an electric circuit diagram for the charger shown in FIGS. 17A,B,C FIG. 19 is a vertical cross-sectional view of a charger embodying the invention fitted with the illuminating lamps shown in FIGS. 17A,B,C, FIG. 20 shows another embodiment in cross-section with the light housing attached to the lower part of the charger body, FIG. 21 is a cross-sectional view as seen in a certain direction, of a push button switch to be used in the charger of the invention, explaining the operation of the switch, and FIG. 22 is a cross-sectional and explanatory view of the same push button switch, as seen in a direction at 90° from that of FIG. 21.

DETAILED DESCRIPTION OF THE EMBODIMENT

In an embodiment shown in FIGS. 1 to 4, the charger generally is divided separably into an upper case 1 having a change-over switch, spaces for receiving the cell to be charged, etc. and an lower case 2 to contain the power source cells, both cases being coupled together by means of engaging portions 2–1. The upper case 1 has, in its top region, cell receiving spaces 4, 4 in which the cells to be charged 3 are to be mounted and a manually operable push button change-over switch 5. In the cell receiving spaces 4, 4 are provided terminals to contact the plus and the minus electrodes of the cells to be charged 3, of which terminals 6, 6 are seen in FIG. 1. On both sides of the cell receiving spaces 4, 4 there are formed recesses 7 adapted for insertion therein of a finger to facilitate the mounting and removal of the cell to be charged 3.

The relation between the upper case 1 and the lower case 2 is clearly seen in FIG. 3. Four UM1 dry cells, for instance, are contained as power source cells 8 in the lower case 2.

When the upper case 1 and the lower case 2 are coupled together by means of engaging portions 2–1, terminals 9, 9 come into electrical contact with the plus electrodes of the power source cells 8 and, on the other hand, terminals 10, 10 come into electrical contact with the minus electrodes of the power source cells. When the cells to be charged 3 are mounted in the cell receiving spaces 4, a discharge circuit therefor will be made through the normally closed contact 11 of the push button change-over switch 5 and resistors 13. By placing the cells in such a position for a certain time, the charge which has remained in the cells 3 will discharge almost completely. Then, the push-button change-over switch 5 is pressed down with a finger whereupon the cell 3 to be charged starts being charged from the source cell 8 through the normally open contact 12 of the push button change switch 5. The period of this charging can be determined by the operator keeping on pressing the push button 5 for a suitable time as he observes a watch, for instance. As mentioned above, the charging of the cell to be charged 3 is conducted only while the push button change-over switch 5 is being pressed down manually. Consequently, a charging of the cell to be charged 3 for a very long time may be avoided, thereby preventing the cell from an overcharged condition by mistake in operation.

Usually, quick chargeable nickel-cadmium type cells as mentioned above are often used in a group connected in series. In such a case, any unbalance in the amount of charge among the cells would cause some of the cells to complete their discharge earlier and thereupon current would flow forcedly through them from the other cells, causing what is called inverse charging phenomenon. In other words, across a cell which has completed its discharge earlier would appear a voltage drop due to its internal resistance causing a voltage that is positive on the negative electrode side of the cell and negative on the positive electrode side of the cell. This phenomenon is called inverse charging and occurrence of such phenomenon would deteriorate the cell rapidly.

In accordance with the charger of the invention, the cell to be charged 3 is first made to discharge through the normally closed contact 11 before it is charged. It is not until the discharge has been fully done that the charging of the cell is started, so, even if there has been some residual charge in the cell to be charged 3, it will be reduced to zero through the above discharge. Thereafter it is possible to be feed the cell with a desired amount of charge by charging it for a selected period of time corresponding to said amount. Thus, occurrence of the inverse charging phenomenon as mentioned above can be prevented in advance.

FIG. 4 is a cross-section of the charger of the invention, in which is shown the change-over switch 5 comprising a push button 14 and a lock washer 18. The positive electrode side terminal 6 of the cell receiving space is formed integrally with a terminal piece 15 having a U-shaped end, which when the push button 14 is pressed down, is pushed down therewith to come into electrical contact with the normally open contact 12. Consequently, a circuit will be completed which goes from the positive electrode of one power source cell 8, through a terminal piece 9 integral with the normally open contact 12, then through normally open contact 12, the U-shaped portion of the terminal piece 15, the positive terminal 6 of the cell receiving space, the cell to be charged 3, the negative terminal 16 of the receiving space, the resistors 13, a terminal piece 10, the negative electrode of the other power source cell 8, the other power source cell 8, the positive electrode of the other cell 8, a connection terminal 17, and back to said one source cell 8. Thus, through this circuit the cell to be charged will be charged.

Figure 2:
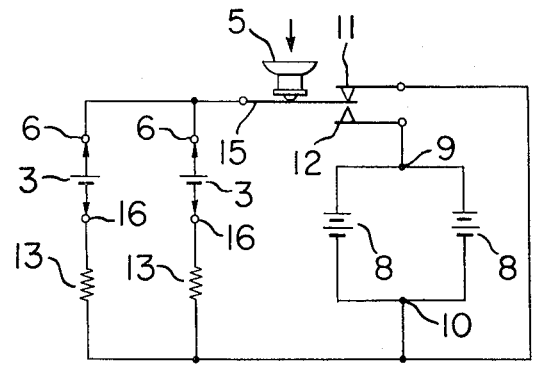
FIG. 2 is an electric circuit diagram therefor.

At this time the end of the extension of the U-shaped portion of the terminal piece 15 is brought out of contact with the normally closed contact 11 shown in FIG. 2, although not clearly shown in detail in the drawing.

As described above, the charger of the invention needs only the provision of a manually operable change-over switch 5 and therefore is very inexpensive and almost free from failure. The cell to be charged 3 is deprived of any residual charge prior to its charging since a discharge circuit for the cell has been formed through a normally closed contact 11 of the change-over switch 5. Furthermore, since the charging is carried out only while the push button change-over switch 5 is being pressed down manually, the chance to forget opening the charging circuit after having finished charging is eliminated.

In the charger of the invention, as stated above, the arrangement is such that the mounting of the cells to be charged in the charger will make a discharge circuit through a normally closed contact in the charger to reduce all residual charges in the cells to zero prior to charging them. It is desired, however, to observe visually the degree of the discharging or charging. An embodiment attaining such a purpose will be described hereinbelow.

Thus, FIG. 5 is a general perspective view of such charger, similar to FIG. 1, and FIG. 6 is a circuit diagram therefor. The difference of this charger from that shown in FIG. 1 is the provision of lamps 13. The design is such that the cell to be charged 3, when placed in the receiving space 4 therefor, makes its discharge circuit through the normally closed contact 11 of the change-over switch 5 and the lamps 13. In this condition, so long as a residual charge exists in the cell to be charged 3, the amount of such charge is indicated by the brightness of the lamp 13.

When the residual charge in the cell to be charged 3 has become zero, the lamp 13 goes out indicating completion of the discharge of the cell 3. Then the change-over switch 5 is pushed down by a finger so that the cell 3 begins to be charged from the source cells 8 via the normally open contact 12 of the change-over switch 5. While the lamp 13 is relatively bright in the earlier stages of the charging, it becomes less bright as the charging proceeds and gets almost dark when the charging has come to an end.

As described above, the present embodiment makes it possible, in a charger wherein the cell to be charged is once discharged and then charged through a change-over switch, to detect easily one or both of the discharged and charged conditions of the cell by the provision of an indicator means, such as a lamp, responsive to the voltage across or the discharge or charge current through the cell. Therefore by watching said indicator means, it is possible to recognize the end of the discharge of the cell and hence to fix the amount of the subsequent charging. Thus, even a plurality of cells may be equally charged without giving rise to an overcharging. Although in the present embodiment, the indicator means have been provided in series with the respective cells to be charged to indicate their respective conditions of discharging and charging, the invention is not intended to exclude the provision of indicator means responsive to the voltage across the cells to be charged only during the discharging or only during the charging operation.

The above mentioned portable charger is not provided with a space to keep spare chargeable cells, so the operator must carry some spare cells in his pocket. Under such circumstances there is a danger that some cell may be short-circuited. The embodiment to be described below solves this problem namely, the interior space of the charger in which the power source cells are placed is also used to admit the spare chargeable cells, considering that the outer diameter of an nickel-cadmium cell is about one third that of a UM1 dry cell.

FIG. 7 is a perspective view of the charger, with its upper case removed, FIGS. 8, 10, 11 and 12 are perspective views of other similar embodiments, and FIGS. 9 and 13 are cross-sectional views showing internal constructions of chargers using the embodiments in FIG. 8 and FIG. 12, respectively. The manner in which the cell to be charged 3 is mounted and charged in the cell receiving space 4 is shown in FIG. 9, but the operation is the same as has been described with reference to FIG. 2 and 4 and therefore will not described here again. In the present embodiment, as shown in FIG. 7, the central space formed by the four power source cells 8 arranged in the lower case 2 is utilized as the storage pocket for chargeable cell 3, in which spare chargeable cells 3 may be inserted. Namely, said central space is just enough to hold cells 3 since the outer diameter of the cell 3 is about one-third that a UM1 dry cell. By taking note of this point, the embodiment enables a safe keeping of cells 3. In the embodiment shown in FIG. 8, the reference numeral 19 denotes partitions for positioning the power source cells, which are four in number and are located against the inner wall of the lower case 2. In this case, the source cells 8 are arranged respectively between said positioning partitions 19 so as to reserve a keeping space or storage pocket for the cells to be charged 3.

FIG. 9 shows a charger so constructed with spare cells stored therein. FIG. 10 shows another embodiment, in which the reference numeral 20 represents a cylindrical storage pocket for spare cells. Said cylindrical pocket, which is fixed on the bottom surface of the lower case 2, has an inner space to receive the spare chargeable cells and has on its lower portion four triangular brackets serving also as positioners for the power source cells 8. FIG. 11 shows still another embodiment, in which the numeral 22 represents a similar arrangement to hold the power source cells 8 and, hence, the spare chargeable cells 3. Said four holding brackets 22 are arranged to position the source cells to form a pocket space in which to properly store spare chargeable cells 3. FIG. 12 shows yet another embodiment, with its lower case 2 seen from the bottom side. In the Figure, the reference numeral 21 shows a cylindrical pocket for storing spare cells in its internal space and which is formed integrally with the lower case 2, there being provide an opening in the bottom of the casing 2. The numeral 23 in the Figure shows a cap to close said opening and this is made of rubber, for instance. FIG. 13 shows a charger so constructed, with power source cells 8, together with spare cells 3, contained in the lower case. In this embodiment, the spare chargeable cells 3 may be readily introduced or removed only by removing the cap 23 from the opening formed in the bottom of the lower case 2, whereas in the embodiments shown in FIGS. 7 to 11, they can not be introduced nor removed without opening the upper case 1.

It is thus seen that in accordance with the embodiments mentioned above, the central space formed by the arrangement of the power source cells is used as a space for storing spare cells therein, whereby enabling an effective use of the interior of the lower case, the prevention of unexpected discharge of the spare cells, and a safe keeping of the cells.

Next, a description will be given of an embodiment which prevents the formation of a wrong charging circuit when the lower case containing the source cells and the upper case having the push button switch and the receiving space for the cells to be charged are coupled together in order to charge the mounted cell by means of the power source cells and the push button switch.

FIG. 14 is a knocked down perspective view of a charger in accordance with said embodiment, and FIG. 15 is a knocked down perspective view explaining the detail of the lower end of the upper case. In FIGS. 14 and 15, the reference numerals 1 and 2 show the upper and the lower cases, respectively, which are both made of resilient material such as plastics. The upper case 1 is provided with a manual push button switch 5 for charging the cell, receiving spaces 4 for the cell to be charged, and a terminal 9 to contact electrically with the positive electrode of the source cell 8 and a terminal 10 to electrically contact with the negative electrode of the source cell 8.

The reference symbols 1—1 and 1-2 show engaging holes of different sizes respectively, and 2-1 and 2—2 show engaging portions of different sizes corresponding to said holes 1—1 and 1-2, respectively. In coupling the upper case 1 with the lower case 2, said engaging holes 1—1 and 1-2 are brought into engagement with the engaging portions 2-1 and 2-2, respectively, thereby uniting the upper case 1 and lower case 2. A fitting notch 24 is formed in the upper edge of the lower case, whereas a fitting projection 25 corresponding to said notch 24 is formed in the upper case 1, so that said projection 25 fits into the notch 24 only when the upper case 1 is coupled to the lower case 2 in the right direction.

If the upper case 1 is placed on the lower case 2 in a wrong way, said engaging portion 2—2 will be confronted by said hole 1—1 of non-corresponding size, while the engaging portion 2-1 will be confronted by the hole 1-2 of non-corresponding size. Furthermore, the projection 25 will not enter the knotch 24. This will permit the operator to notice that he has placed the cases in a wrong way.

The reference numeral 6 shows terminals integrally formed with said change-over contact 11 and to contact electrically the cell to be charged and positioned in grooves although not clearly shown in the Figure. Said terminal 6 will contact the positive electrode of the cell to be charged if the cell is mounted in the right direction, while, if the cell is mounted in the wrong direction the terminal 6 will not be contacted by the minus electrode of the cell to be charged, because in the latter case the end face of the negative side of the cell will strike the shoulder portion of said groove. So the terminal 6 serves to prevent inverse connection of the cell to be charged.

As described above, in accordance with the embodiment, it is ensured that no positioning of the upper case in a wrong direction should occur when it is to be fitted onto the lower case containing source cells arranged in a predetermined disposition. The embodiment also prevents the cell to be charged from being mounted with the wrong polarity.

In the charger described above, the cell to be charged is charged from the power source cells as the upper case is integrally coupled with the lower case. It is eventually required to replace the source cells 8 with new ones as they decay. In such circumstances, it is desired to separate the cases apart in a simple, easy and speedy way.

This point is solved by the embodiment to be described below. FIG. 16 is a cross-sectional view of that embodiment.

In the Figure, the reference numeral 3 shows a cell to be charged mounted in the cell receiving space 4; 26 shows a lock piece of a push button switch 5; 11 a normally closed contact, 12 a normally open contact; 16 a resilient terminal and connected electrically to the minus electrode of the cell to be charged 3; 17 shows a connection terminal positioned on the floor of the lower case 2 for connecting the plus electrode of one power source cell 8 with the minus electrode of another source cell 8.

In this charger, the upper case 1 and the lower case 2, especially the lower case 2, are formed of a deformable material such as plastics. The terminal pieces 9 and 10 are resilient and are designed to press down the power source cells 8 strongly when both said cases are coupled together.

In order to detach the cases from each other, the lower case 2 is held and pushed inwardly, near the engaging portions 2-1, 2—2, with the thumb and the forefinger of the left hand whereby the lower case 2 will be deformed so as to free the engaging portions 2-1 and 2—2 from their respective holes 1—1 and 1-2. As soon as the holes 1—1 and 1-2 respectively are disengaged from the portions 2-1 and 2—2, the upper case 1 will pop upwardly and depart quickly from the lower case 2 because of the elastic energy stored in said elastic terminal pieces 9 and 10. In accordance with this embodiment it is possible to separate the upper and the lower cases apart in a simple, easy and speedy way. Engagement of both the cases can be done only by pushing down the upper case to fit the engaging portions 2-1, 2—2 into the holes 1—1, 1-2.

Now a description will be given of a portable charger as described above, embodying the invention, further provided with a lamp which can be energized using the power source cells contained in the charger, in order to give an illumination at night in case of emergency. FIG. 17A shows the charger section, FIG. 17B shows the light housing section as seen obliquely from above, and FIG. 17C shows said housing section as seen obliquely from below. FIG. 18 is a circuit diagram for the charger having the lamp shown in FIG. 17, FIG. 19 is a cross-section of said charger, and FIG. 20 shows another embodiment in which the light housing is attached to the underside of the charger.

The charger proper shown in FIG. 17A is of the same construction as the charger shown as in FIG. 1. To this charger proper is added a light housing shown in FIGS. 17B and 17C to complete the whole charger according to the present embodiment. The light housing 27 has engaging portions 27-1 to fit into engaging portions 1—1 formed in the upper case 1. On the upper surface of the light housing 27 are provided a lamp 30 and a reflective mirror 28 protected by a cover glass 29 fixed with screws 31. An on-off switch 32 is provided in the side wall of the light housing 27. As seen in FIG. 17C, terminals 33, 34 are provided at the underside of the light housing 27 and adapted to contact electrically with the heads 35, 36 of terminal screws shown in FIG. 17A. In FIG. 19 is shown a cross-section of the charger mentioned above with said lamp.

When the push button of the charge-over switch 5 is pushed down, the change-over spring contact 15 will disengage the normally closed contact 11 and make electrical contact with the normally open contact 12. As a result, there will be made a circuit going from the positive electrode of one power source cell 8, through a terminal piece 9 integral with the normally open contact, the normally open contact 12, the change-over contact 15, the plus terminal 6 in the cell receiving space, the cell to be charged, the minus terminal 16 of the cell receiving space, a resistor 13 not shown (see FIG. 18), terminal piece 10, the negative electrode of the other power source cell 8, the other source cell 8, the positive electrode of the source cell, a connection terminal 17, the negative electrode of said one power source cell 8, and back to the positive electrode of said one cell. Consequently the cell 3 will be charged as stated before. At this time, the normally closed contact 11 is out of contact with the change-over contact 15.

The terminal piece 9 is electrically connected with the terminal screw head 35 by means of the screw, while in the same way the terminal piece 10 is electrically connected with the screw head 36 by means of the screw. The terminal screw heads 35, 36 are shown also in FIG. 17A.

A terminal 37, attached to the light housing 27, is connected to a terminal 38 of lamp 30 via a switch 32 (see FIGS. 17B, C) not shown in the Figure, while a terminal 39 is connected to the socket of the lamp 30. The numeral 40 shows a handle. With the arrangement mentioned above, the lamp 30 is turned on when the switch 32 is on as shown in FIG. 18.

In FIG. 20 there is shown another embodiment, in which the light housing 27 is permanently added to the lower part of the lower case 2 of the charger. The lamp 30 is threaded into a socket in a central space surrounded by the four power source cells 8. Namely, as shown in FIG. 20, an insulating pipe 41 extends through said central space and has leads 42, 43 fixed therein. One end of the lead 42 is electrically contacted, at the shoulder of said insulating pipe 42, by a normally open contact 12 similar to that shown in FIG. 19, whereas the other end of the lead 42 is contacted by terminal 38 of the lamp 30. One end of the lead 43 is contacted, at the shoulder of the pipe, by a contact piece 44, while the other end of the lead 43 is contacted by the socket for the lamp 30. The contact piece 44 is connected to the minus terminal of source cell 8 via switch 32 (FIG. 18) not shown.

This embodiment, as described above, comprises a charger proper capable of charging a cell by means of the source cells and a light housing 27 with a lamp 30, added to the charger. It is not seldom that small-size, high-quality chargeable nickel-cadmium cells such as stated above (cells to be charged) are used as power sources for transistor radios. The charger in accordance with the present embodiment may be used to charge a cell as the power source for a transistor radio and also may be used as an illuminating lamp during the failure of electric power. Also in accordance with the embodiment, the diameter of the mirror 28 can be sufficiently large to provide a very bright source of light.

The embodiment is also advantageous to use up the power source cell 8 efficiently, since, even if the source cell has been too weakened to serve as a charging power source, yet it may still be used effectively as the source of supply to the lamp 30. It also enables to detect the degree of consumption of the source cell 8.

Although in the foregoing embodiments the charging has been described as being done from the power source cells 8, the invention does not exclude charging from an external source by providing an external supply consent, provided that the charger be designed also to be able to charge separately from the aforementioned source cells 8 as well.

FIGS. 21 and 22 describe the push button switch used in the foregoing chargers. FIG. 21 is a cross-sectional view of the push button switch as seen in a first direction and FIG. 22 is a cross-section thereof as seen in a direction at 90° from that in FIG. 21.

The push button 14 is provided at the top of the case 1 and is movably fitted in the upper case 1 by means of a screw 46 with a lock washer 45 in between. Under the screw 46 of the push button 14 is positioned a movable contact terminal member comprising a U-shaped elastic plate 15 whose lower end is fixed to a pedestal not shown. In the space formed by the U-shaped movable contact terminal member 15 is disposed a fixed contact 12 resiliently supported by a contact member 47 which is secured to the case 1 by means of a screw 48. If desired, another fixed contact comprising a screw 49 is fitted to the case 1, as shown in FIG. 21. When the push button 14 is not pushed down, the movable contact 15 forces the push button upward because of its elasticity and also electrically contact the fixed contact 50. That is, said fixed contact 50 constitutes a normally closed contact.

When the push button 14 is pushed down as shown by the arrow in FIG. 21, the U-shaped movable terminal member 15 is forced downward against its own elasticity, thereby to open the normally closed fixed contact 50. Upon reaching the position 15-1 shown in the Figure, it will contact the fixed contact 12. As the member proceeds through positions 15-2, 15-3, the fixed contact 12 is pushed down to the positions 12-2, 12-3 shown in the Figure against the elastic force of the contact member 47. Since the fixed contact 12 is simultaneously moved in the vertical direction, it goes without saying that its point of contact against the movable terminal member 15 moves in the longitudinal direction of the member 15.

As stated above, during the pushing down of the push button 14, the point of contact between the movable contact member 15 and the fixed contact 12 moves in a sliding manner, so that the contacting area of the surface of the member 15 may be polished, removing possible formation of oxide layer on the surface thereby reducing contact resistance there. The angle made by the contact member 47 with a horizontal plane is preferably 45° to 50°, considering the limit of elasticity, although the nearer to 90° the said angle is, the greater will be the slipping stroke mentioned above. It is understood that the push button of this embodiment, though it is small in size and simple in construction, is able to largely reduce resistance loss under a large current, high voltage condition without using any special contact material. It is available inexpensively. It is seen that this switch may therefore be used well as lossless push button switch in a charger in accordance with the invention in which a relatively large charging current flows.

Although this invention has been described in connection with its illustrated examples, it will be apparent that the invention is not limited specifically thereto but may be modified and varied without departing from the scope of the novel concepts of the invention.

What is claimed is:

1. A charger comprising, in combination, a first case provided with a cell receiving space for mounting therein one or more cells to be charged, a charging circuit, a discharging circuit and a manual change-over switch for controlling the charging and the discharging circuit for one or more cells to be charged mounted in said cell receiving space, said manual change-over switch comprising a push button, a movable contact member having a space therein and a resilient piece movable upon depression of said push button and a fixed contact member resiliently supported and positioned in the space in said movable contact member, and a second case releasably coupled to said first case, said second case containing a plurality of source cells serving as the charging power source for the cell to be charged, said change-over switch having a normally closed contact to make the discharging circuit for the cell to be charged and a normally open contact to make the charging circuit for the cell to be charged.

2. A charger as claimed in claim 1, further provided with an indicator means responsive to the voltage across or current through the cell to be charged mounted, whereby to indicate the degree of at least one of the discharged and the charged conditions of the cell to be charged.

3. A charger as claimed in claim 2, in which said indicator means is inserted in series with the cell to be charged.

4. A charger as claimed in claim 1, in which said plurality of power source cells contained in the second case is arranged with their axes parallel so as to form a space therebetween constituting a storage pocket for the cell to be charged.

5. A charger as claimed in claim 4, in which partition plates for positioning the power source cells are provided in the interior space of said second case.

6. A charger as claimed in claim 4, in which a cylindrical spare cell storing pocket is extending vertically upward from the bottom of the second case in the interior space thereof.

7. A charger as claimed in claim 6, in which said cylindrical spare cell storing pocket has an opening penetrating the bottom of the second case.

8. A charger as claimed in claim 1, in which the first case has engaging holes of different sizes and the second case has engaging portions of different sizes corresponding to said engaging holes for coupling said first and second cases to each other.

9. A charger as claimed in claim 1, in which the first case is provided in its lower marginal part with first engagement positioning portions prepared asymmetrically, and the second case is provided in its upper marginal part with second engagement positioning portions corresponding to said first engagement positioning portions for coupling said first and second cases to each other.

10. A charger as claimed in claim 1, in which said cell receiving space of the first case has a groove of such a width as to admit the positive terminal of the cell to be charged, with a terminal set in said groove.

11. A charger as claimed in claim 1, wherein at least one of said first and second cases is deformable and including elastic terminal pieces secured to the lower surface of the first case, and means to couple the first and the second cases together, said coupling means becoming disconnected by the elastic action of said terminal pieces upon deformation of at least one of the first and the second cases.

12. A charger as claimed in claim 11, in which the first case is provided with engaging holes and the second case is provided with engaging portions, said engaging portions being adapted to fit in said engaging holes from inside.

13. In a charger as claimed in claim 1 comprising in combination with the first case and the second case, a light housing having an illuminating lamp therein which may be energized from said power source cells.

14. A charger as claimed in claim 13, in which the light housing includes conductive terminals to contact electrically with the terminals of the power source cells which are exposed from the upper surface of the first case to which the light housing is fitted and fixed.

15. A charger as claimed in claim 13, in which the light housing is attached to the lower face portion of the second case.

16. A charger comprising, in combination, a first case provided with a cell receiving space for mounting therein one or more cells to be charged, a charging circuit, a discharging circuit and a manual change-over switch for controlling the charging and the discharging circuit for one or more cells to be charged mounted in said cell receiving space, and a second case for containing a plurality of source cells serving as the charging power source for the cell to be charged, at least one of said first and second cases being deformable said change-over switch having a normally closed contact to make the discharging circuit for the cell to be charged and a normally open contact to make the charging circuit for the cell to be charged, said charger further including elastic terminal pieces secured to the lower surface of the first case, and means to couple the first and the second cases together, said coupling means becoming disconnected by the elastic action of said terminal pieces upon deformation of at least one of the first and the second cases.

17. A charger as claimed in claim 16, further provided with an indicator means responsive to the voltage across or current through the cell to be charged whereby to indicate the degree of at least one of the discharged and the charged conditions of the cell to be charged.

18. A charger as claimed in claim 17, in which said indicator means is inserted in series with the cell to be charged.

19. A charger as claimed in claim 16, in which said plurality of power source cells contained in the second case is arranged with their axes parallel so as to form a space therebetween constituting a storage pocket for the cell to be charged.

20. A charger as claimed in claim 19, in which partition plates for positioning the power source cells are provided in the interior space of said second case.

21. A charger as claimed in claim 19, in which a cylindrical spare cell storing pocket, extends vertically upward from the bottom of the second case in the interior space thereof.

22. A charger as claimed in claim 21, in which said cylindrical spare cell storing pocket has an opening penetrating the bottom of the second case.

23. A charger as claimed in claim 16, in which the first case has engaging holes of different sizes and the second case has engaging portions of different sizes corresponding to said engaging holes for coupling said first and second cases to each other.

24. A charger as claimed in claim 16, in which the first case is provided in its lower marginal part with first engagement positioning portions prepared asymmetrically, and the second case is provided in its upper marginal part with second engagement positioning portions corresponding to said first engagement positioning portions for coupling said first and second cases to each other.

25. A charger as claimed in claim 16, in which said cell receiving space of the first case has a groove of such a width as to admit the positive terminal of the cell to be charged, with a terminal set in said groove.

26. A charger as claimed in claim 16, in which the first case is provided with engaging holes and also the second case is provided with engaging portions, said engaging portions being adapted to fit in said engaging holes from inside.

27. In a charger as claimed in claim 16 comprising in combination with the first case and the second case, a light housing having an illuminating lamp therein which may be energized from said power source cells.

28. A charger as claimed in claim 27, in which the light housing includes conductive terminals to contact electrically with the terminals of the power source cells which are exposed from the upper surface of the first case to which the light housing is fitted and fixed.

29. A charger as claimed in claim 27, in which the light housing is attached to the lower face portion of the second case.

30. A charger as claimed in claim 16, in which said manual change-over switch is a push-button switch comprising a push button, a movable contact member having a space therein and a resilient piece movable upon depression of said push button, and a fixed contact member resiliently supported and positioned in the space in said movable contact member.

* * * * *

UNITED STATES PATENT AND TRADEMARK OFFICE
CERTIFICATE OF CORRECTION

PATENT NO. : 3959706
DATED : May 25, 1976
INVENTOR(S) : KENICHI MABUCHI ET AL.

It is certified that error appears in the above-identified patent and that said Letters Patent are hereby corrected as shown below:

In column 10, line 41 delete the word "MOUNTED"

Signed and Sealed this

Thirty-first Day of August 1976

Attest:

RUTH C. MASON
*Attesting Officer*

C. MARSHALL DANN
*Commissioner of Patents and Trademarks*